United States Patent

Thayer

[15] 3,665,474

[45] May 23, 1972

[54] HIGH DENSITY COMMUNICATIONS SYSTEM

[72] Inventor: Olin E. Thayer, Houston, Tex.

[73] Assignee: Amscat Corporation, Houston, Tex.

[22] Filed: Jan. 12, 1970

[21] Appl. No.: 7,424

Related U.S. Application Data

[62] Division of Ser. No. 573,632, Aug. 19, 1966, Pat. No. 3,497,618.

[52] U.S. Cl. ....343/200, 178/67, 179/15 FD, 325/30, 325/38 A, 325/320

[51] Int. Cl. ....H04b 1/04, H04b 1/16

[58] Field of Search ....178/66 R, 67, 68, 88 R; 179/15 FD; 325/30, 38 R, 38 A, 141, 321, 320; 343/200

[56] References Cited

UNITED STATES PATENTS 3,230,310 1/1966 Brogle ....178/68

*Primary Examiner*—Robert L. Griffin
*Assistant Examiner*—Kenneth W. Weinstein
*Attorney*—Arnold, White & Durkee

[57] ABSTRACT

Binary data is encoded in sinusoidal form. Two complementry sine waves at the binary data frequency are generated; one is positively biased, the other is negatively biased. The binary data selectively gates each sine wave. At the receiver, a zero dc level sine wave is recovered and clock pulses are derived from the peaks of the recovered wave. One binary level is produced when a clock pulse coincides with a positive peak of the incoming sinusoid; the other binary level is produced when a clock pulse coincides with a negative peak of the incoming sinusoid.

11 Claims, 8 Drawing Figures

HIGH DENSITY COMMUNICATIONS SYSTEM

This application is a divisional of application Ser. No. 573,632 filed Aug. 19, 1966, now U.S. Pat. No. 3,497,618.

This invention pertains to a communications system and more particularly to a system of communicating digital messages utilizing the modification of a standard data form to a form suitable for high density transmission. While the system may be adapted to a situation in which the base is other than two, the greatest efficiency and operational ease appears to occur with a binary-coded, digital message. Therefore, the description herein is made with respect to two-state digital data.

In general, digital data machines, such as computers, convey information by means of a signal created by switching from one predetermined d-c potential to another. The smallest incremental data forming the component parts of a data message is referred to as a data bit, each bit usually having the same predetermined and fixed duration as every other bit. The first potential to which a bit may be switched in a binary-coded message represents a first code condition and the other potential to which a bit may be switched represents the second code condition. Hence, a data message signal is represented by a series of bits or pulses conveying meaningful information in accordance with the successive d-c potential conditions of its data bits.

It may be recognized that a binary data message may be created by employing a two-state generator (a generator having two different d-c potential outputs) and a switching or clock pulse generator producing a signal (known as a clock pulse signal) having sharp pulses at spaced intervals equal to the length of a data bit. The enabling or disabling (selection or non-selection) of the specific pulses within the clock pulse signal for controlling the selection of the alternate outputs from the two-state generator is achieved in accordance with a coded driving means, such as a signal from a card reader.

When a first digital data machine is connected to operate a second data machine at the same physical location, it is common to use the clock pulse generator to synchronize operations. In the case where the digital data machines are physically separated by a significant distance, it becomes difficult to communicate the generation of the signal representing the data message at a first or transmit location and the recognition of the data message at a second or receive location.

Transmitting and receiving square-wave signals (the shape of two-level data signals) is slow and involves complex circuits. Moreover, the physical media employed invariably introduces distortions to the signals, often resulting in ambiguities.

In addition, recreating a two-state signal at a receive location involves conversion circuits operating in identical time relationship with the signal transmitted from the transmit location. Since the use of an identical clock pulse signal at locations remote from each other is difficult or impossible, synchronization of the machines at the two locations using two different clock pulse signal sources in most cases is unsatisfactory. This can be seen by assuming that the clock pulses in the signal from a first clock pulse generator at one location are slightly closer together than the pulses from the clock pulse generator at a second location. As the switching points established by the respective clock pulse signals gradually occur at different positions, the very least result that may happen is that a data bit is eventually dropped or skipped, thereby causing at least some ambiguity in the received message. This non-synchronous operations could result in a complete garbling of the transmission.

Because absolute synchronism has heretofore been difficult, servosystems have been employed to constantly correct for error tendencies. However, in such systems, various signals often cause false indications of error which results in intermittent loss of data signal reception.

It may be seen, therefore, that efficient communications of digital messages must involve conversion of the message to a signal definition which may be efficiently transmitted and positively identified at the receiving point.

One scheme that has been used successfully in prior systems for this purpose employs the conversion of the digital data message to an analog signal, such as in communicating voice and music signals. The chief shortcoming of such a scheme is that excessive signal bandwidth is occupied, ("bandwidth" meaning the frequency spectrum lying between the maximum frequency component and the minimum frequency component of a signal).

In the communications of an analog signal, there is no known method of predetermining the instantaneous frequency of the signal. The only thing that can be said about the frequency of the usual analog signal at any instance of time is that it lies somewhere between the limits of the bandwith. Hence, heretofore signal bandwidth has been the exclusive property of a given signal. That is to say, a signal bandwidth heretofore could only have been occupied by one signal at a time.

It may also be seen that when the bandwidth of two of these usual analog signals overlap, interference results, thereby often resulting in the destruction of the identification of one or both of the interfering signals. Because of this exclusive property of signal bandwidth, heretofore a measure of the communications efficiency of a given medium has been the signal bandwidth it accommodates.

Therefore, what is disclosed herein is a system for handling a plurality of two-state digital messages in the same bandwidth previously thought to be the exclusive property of only one such message. In the system described herein the detrimental effects of interference between message signals occupying overlapping or even identical spectrum bandwidths are automatically mitigated.

The signals established in accordance with the herein described invention do not exclusively occupy a spectrum bandwidth and hence the information density of which a communications medium is capable is a function of the information density of each of the plurality of signals and the signal passband of the medium. Even assuming that the medium only has one signal passband, a substantial increase in the total information handling capacity over conventional analog signal systems is achieved.

Moreover, the system described herein allows for the establishment of a clock pulse signal at the receive location directly from the signals received (ignoring both noise and even intermittent interruptions of signal). By using only the signal received to establish the basic timing function at the receive location, there is no attempt at synchronizing the receive-site clock pulse signal with the transmit-site clock pulse signal. Even though the transmitted signal may have undergone significant phase shifting during transmission, there is minimum danger of losing part of or all of the signal at the receive location.

Basically, as indicated above, the system provides a means for transmitting simultaneously serial, binary, digital data messages. Initially, at the transmit location each serial data signal (the special shape of which is hereinafter described) is identified with a discreet angular velocity different from the angular velocity with which all other data signals are identified. Furthermore, although the frequency spectra occupied by the various signals overlap, each is readily selectable therefrom solely on the basis of its identifying angular velocity.

Selection is most usually accomplished through the use of high Q resonant circuits tuned at angular velocity separations equal to those of the transmitted signals. Each serial data signal easily produces at the receive site a digital message corresponding to that from a transmitting unit at the transmit site, the interval spacing of the bits therein being at the clock pulse interval established at the transmit site.

It should be further noted that there is no possibility of one receiving circuit shifting in operating phase to confuse one data message with another, the various receiving circuit operations each being locked to its own angular velocity signal.

The method of transmitting and receiving the two-state data message disclosed herein comprises generally at the transmit site of (1) generating a master clock-pulse signal having an interval identically equal to the data bit information being handled, (2) creating a pair of complementary sinusoidal waveforms, one of positive polarity and one of negative polarity, each having a period equal to the master clock pulse interval, (3) selecting between the two created sinusoidal phase forms in accordance with the state of the data bit, such that a positive polarity selection represents one state and a negative polarity selection represents the other state to establish a data waveform and (4) transmitting the established data waveform by any convenient means, and at the receive site of (1) receiving the data waveform (2) creating a sinusoidal waveform from the received data waveform, (3) establishing a receiver clock pulse signal from this created sinusoidal waveform, (4) detecting at a timing sequence determined by the receiver clock pulse signal the polarity condition of the received data waveform, and (5) recreating a two-state message corresponding to the polarity conditions detected.

As is readily apparent, for each data message the inventive method establishes a message-coded, composite signal. For each data bit interval there is a full period, sinusoidal wave starting and ending with a peak thereof and either polarity positively-biased or negatively-biased with respect to a fixed potential depending upon the selected state of the corresponding data bit. From bit to bit, therefore, there is selected either a full-cycle sinusoidal, positively-biased wave or a full-cycle sinusoidal, negatively-biased wave in accordance with the condition of the bits in the data message.

For transmitting and receiving multiple two-state data messages on the same communications channel and with no increase in effective bandwidth, the method outlined above may be repeated to establish other data waveforms at angular velocities only slightly different from that of the first-established data waveform. The only limitation in the amount of phase displacement is the practical one of separately detecting the individual data waveforms and producing the individual data messages without interference. Full duplex operation wherein the same angular velocity is used for a pair of message-coded signals, one in each direction, may be used when hybrid circuits are employed.

When frequency modulation in used as the transmission medium, rather than using a different angular velocity for each of the separate messages, it is possible to use the same frequency as a basis for the composite, message-coded signals for all messages, each composite signal being locked at slightly different phase displacements.

The heart of the preferred unique receiving circuit is a network employing a diode gating arrangement that circulates a current through the coil of a high-Q transformer in the same direction regardless of the polarity (bias direction from a fixed potential) of the cycle of the received composite signal.

In order that the manner in which the various advantages of the invention are attained and in order to understand the invention in detail, reference is had to the accompanying drawings which form a part of this specification. It is to be noted, however, that these drawings illustrate only typical embodiments of the invention and therefore are not to be considered limiting of its scope, for the invention may admit to other equally effective embodiments.

Figure 1:
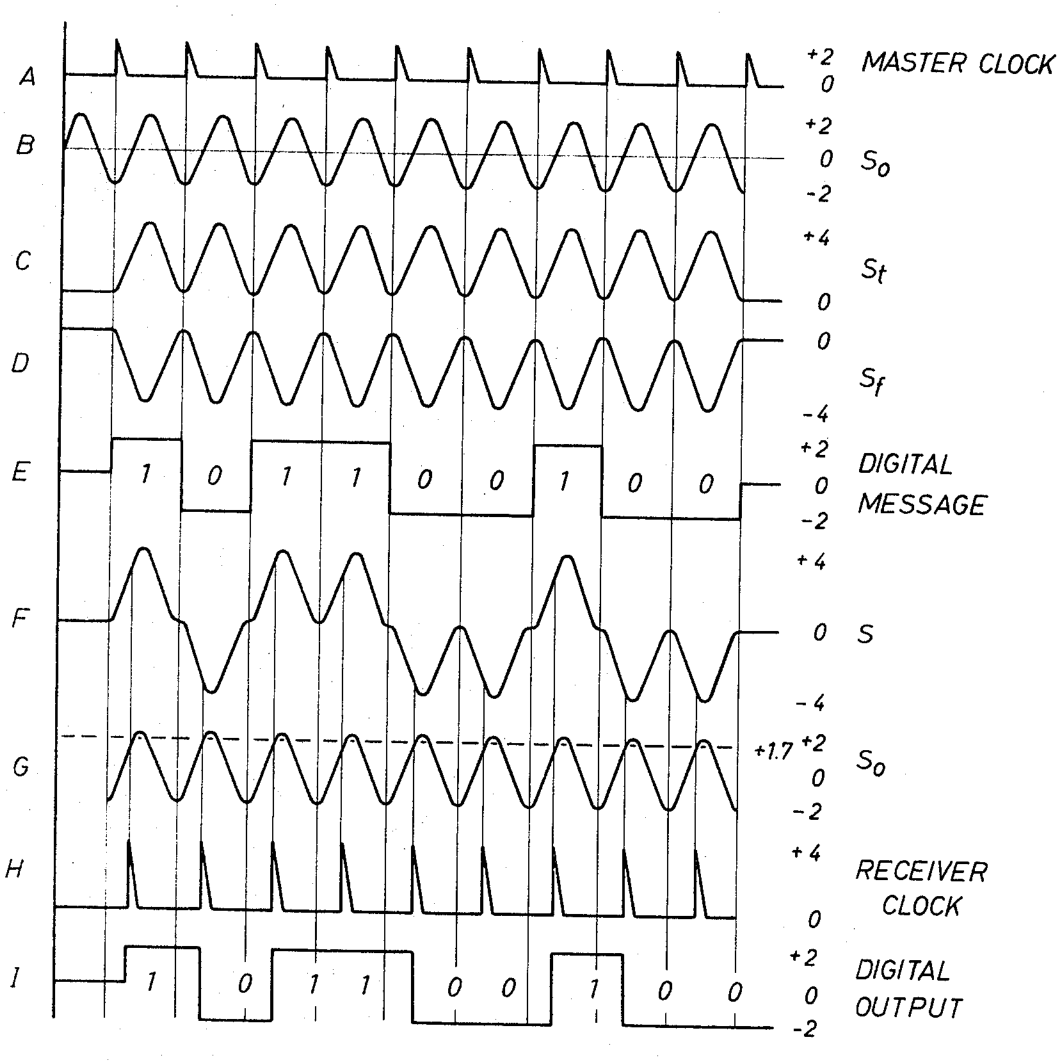
FIG. 1 is a timing diagram showing the shape and relative position of the pertinent waveforms in the exemplary illustrated embodiments of the invention.

To assist in understanding the various waveforms existing in the basic exemplary system herein described, identifying letters are assigned. In this system the composite signal, coded in accordance with a digital message, is referred to as "S." The signal S comprises selections of two signal states $S_t$ and $S_f$ (which are complementary logic waveforms of a basic sinusoidal waveform $S_o$). Signal state $S_t$ is polarized always to be positive and $S_f$ is polarized always to be negative. For convenience of reference and ignoring d-c constants $S_t$ may be identified as $1 - \text{Cos}\ \omega t$ and $S_f$ may be identified as $\text{Cos}\ \omega t - 1$.

It may be further noted that the periods of $S_t$ and $S_f$ (corresponding to the length of a data bit) begins and ends where $\omega t$ is an integer multiple of 2 pi. Therefore, the maximum data rate is $\omega/2$ pi bits per second. Henceforth, a unit integer is assumed so that the period of $S_t$ and $S_f$ is 2 pi.

Referring now to FIG. 1A–1I, a timing chart for a single data message is shown. The waveforms are later located within the circuit to be described herein. However, a preliminary understanding of this timing chart at this time is believed to be helpful.

FIG. 1A and FIG. 1B depict the master clock pulse signal (the clock pulse signal at the transmit site) and the transmit site sinusoidal wave $S_o$, respectively. In the diagram, $S_o$ is phased to have its peak negative values coinciding with the clock pulses within the clock pulse signal. It may be recognized that $S_o$ may be phased to have its peak positive values coinciding with the clock pulse, or for that matter, any fixed repetitive position compatible to accomplish the operation hereafter described.

FIG. 1C illustrates signal $S_t$, which is a sinusoidal wave in phase with $S_o$, but clamped positive with respect to zero, or the reference voltage. FIG. 1D illustrates $S_f$, a signal identical to $S_t$, displaced 180 degrees therefrom and clamped negative to zero, or the reference voltage.

FIG. 1E shows a hypothetical two-state digital message wherein the "one" bits are represented by a +2-volt d-c potential and the "zero" bits are represented by a -2-volt d-c potential. The hypothetical message selected is 101100100.

FIG. 1F shows the composite signal S (the successive cycles thereof selected from between $S_t$ and $S_f$ in accordance with the bit states of the digital message). For purpose of discussion, it may be assumed that S as shown in FIG. 1F exists at both the transmit and receive sites, although in actual practice S at the receive site may be phased at a later position in time, as may be caused by the propagation medium.

FIG. 1G in the reconstructed signal $S_o$ at the receive site, the signal being derived from composite signal S shown in FIG. 1F.

FIG. 1H shows the clock pulse signal at the receive site, the signal being derived from the receive site signal $S_o$ shown in FIG. 1G.

Finally, FIG. 1I shows the reconstructed hypothetical digital data message at the receive site in terms of a conventional two-state form.

Figure 2:
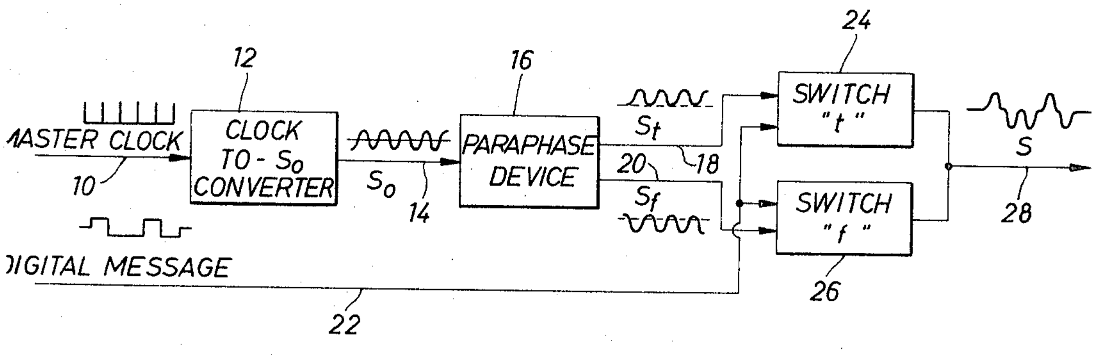
FIG. 2 is a simplified block diagram of an embodiment of the transmit circuit of the invention.
Figure 3:
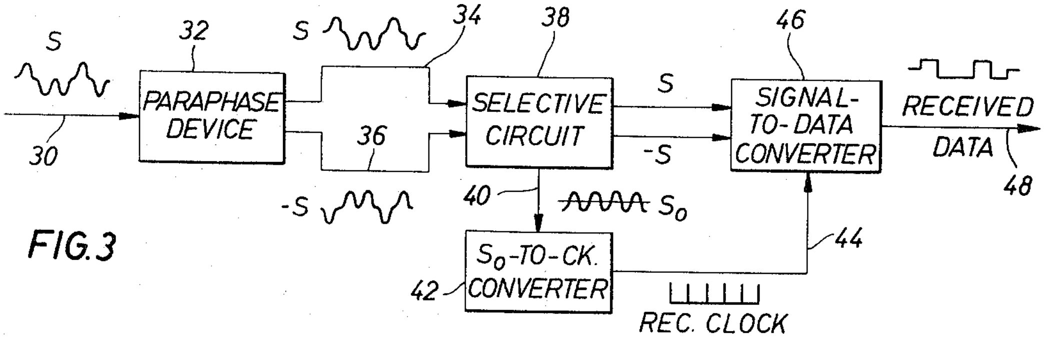
FIG. 3 is a simplified block diagram of an embodiment of the receive circuit of the invention.

Referring now to FIGS. 1, 2 and 3, and considering them together, an embodiment of the invention in which only a single, two-state data message is transmitted and received is shown. As is typical of two-state data handling equipment, control is established and maintained via a clock pulse signal 10, such a signal being comprised of equally spaced, sharply-spiked pulses, as is shown in FIG. 1A.

For convenience of reference herein, the clock signal at the transmit site location is referred to as the master clock signal, and will be considered as having sharply-spiked appearing pulses between zero and +2 volts. A pulse typically decays exponentially after the initial peak value is reached, but for purposes herein, may be thought of as existing instantaneously in time at the occurrence of its peak.

A clock-to-$S_o$ converter 12 may conveniently take the form of an oscillator circuit controlled in frequency by the clock pulse signal 10 just described, or perhaps may merely take the form of a tuned filter circuit. The waveform $S_o$ 14 from converter circuit 12 is a sinusoidally-shaped waveform having a period equal to the interval spacing between pulses in master clock signal 10. This produced sine wave $S_o$ is generated and phased with respect to the master clock signal such that from cycle to cycle thereof the pulses of the master clock signal occur at the successive negative peak values of $S_o$, nominally established at −2 volts, as shown in FIGS. 1A and 1B.

It may be recognized that in any particular system, a sine wave generator may be used to produce the initial signal forming the basis for the master clock pulse signal, rather than vice versa, as above described.

The output from converter 12 is applied to a paraphase device 16, such as a paraphase amplifier, and clamped appropriately to thereby produce two complementary signals $S_t$ 18 and $S_f$ 20. One of these signals, $S_t$, is synchronized with $S_o$, but biased positively with respect to a zero d-c voltage level. Typically, the peak-to-peak value of $S_t$ may be 4 volts. The other of these signals, $S_f$, is biased negatively with respect to a zero d-c voltage level, but has the same peak-to-peak value as $S_t$, nominally 4 volts.

The two-state message 22 is digitally coded such that one voltage level (e.g., +2 volts) represents a unit "one" in the digital message and another voltage level (e.g., −2 volts) represents a unit "zero" in the digital message. A complete word of a digital message might appear as shown in FIG. 1E, with the switching points between the information bits of the digital message occurring simultaneously with the pulses in the master clock signal. This is readily accomplished if the clock pulses are used as the means for interrogating the digitally stored message in the storing medium.

Using conventional switching techniques, it is then possible to alternately select $S_t$ or $S_f$, by applying $S_t$ 18 and digital message 22 to a switch "*t*" device 24 and by applying $S_f$ 20 and message 22 to a switch "*f*" device 26 and combining the outputs to form a signal S 28, as shown in FIG. 1F. Switch "*t*" and switch "*f*" devices 24 and 26 may merely take the form of gate circuits for allowing respectively signals $S_t$ and $S_f$ to pass when the digital message state is in a "one" condition (for operating switch "*t*") and "zero" condition (for operating switch "*f*").

Signal S 28 that is produced is a complex, composite waveform uniquely digitally coded with the digital message. For every "one" bit there is a complete sinusoidal cycle of the $S_t$ signal progressing from its maximum negative, or bias, peak value to its maximum positive peak value to its maximum negative value. For every "zero" bit there is a complete sinusoidal cycle of the $S_f$ signal progressing from its maximum positive, or bias, peak value to its maximum negative peak value to its maximum positive peak value. Therefore, the peak-to-peak value of the whole composite waveform is twice the peak-to-peak value of $S_t$ or $S_f$, but for each cycle of S, the peak-to-peak value is merely the same for the corresponding $S_t$ or $S_f$ cycle selected as a basis for forming a cycle of S.

It may be noted that the scheme just described provides a simple means for encoding the message, which can then be decoded in the manner hereafter described. More significantly, it will be seen that one characteristic of such a developed signal is that when such a signal as the complex signal developed above is differentiated with respect to time, the initial signal may be restored through integration with respect to time, a highly desirable characteristic for efficient propagation on a transmission line. Use of resonant circuits in the selection of the transmitted signal at the receive site exploits this characteristic.

The complex, composite and message-coded signal S may then be transmitted to a receive site by any convenient means, such as by cables and land lines or by being modulated via amplitude or frequency modulation carriers. The frequency modulation application is a somewhat special application of the basic technique and is explained more in detail below.

At the receive site, the received signal S 30, which may have undergone a phase shift caused by propagation distances, environmental conditions and the like, after appropriate detection and/or demodulation is applied to a paraphase device 32, such as a paraphase amplifier. The resulting outputs from device 32 are a signal S 34, substantially identical and normally in phase with received signal S 30, and a signal −S 36, also substantially identical with received signal S 30 but complementary or inverted with respect to signal S 34.

Actually, it should be noted that paraphase device 32 has not identified signal S 34 from other signals at the same frequency as S, but that it does treat all frequencies in the manner described. The actual selection of the desired signal S 34 is performed in selective circuit 38, to be described.

Signals S 34 and −S 36 (along with other message-coded, composite signals derived at signals having slightly different angular velocities) are applied to a selective circuit 38, to be described in detail below, which establishes a sinusoidally-shaped signal $S_o$ 40. The selective circuit, in addition, selects the desired signals S and −S (at the angular velocity of the transmitted signal with which it is tuned) and passes them to the subsequent circuit. As shown in FIG. 1G, signal $S_o$ may have a peak-to-peak value of 4 volts around a zero d-c bias level.

Signal $S_o$ 40 from circuit 38 is then applied to $S_o$-to-clock converter circuit 42, which may be a circuit such as a blocking oscillator, or perhaps a circuit such as shown in FIG. 15–20 of Pulse and Digital Circuits, Jacob Millman and Herbert Taub, McGraw-Hill Book Company, Inc., copyright 1956.

A preferred circuit, however, is a Schmidt trigger circuit set to trigger at a point near the positive peak value of signal $S_o$. This value may nominally be set to be +1.7 volts. The resulting output signal, identified herein as the receive clock pulse signal 44, from such a circuit may be a series of sharply spiked pulses from zero-to-4 volts occurring at the triggering time of the Schmidt trigger and therefore synchronized vary closely with the positive peaks of the successive cycles in signal $S_o$.

Signals S 34, −S 36 and receive clock pulse 44 are all applied to a signal-to-data converter circuit 46. This circuit may merely take the form of a peak detector that provides a first d-c level state when a receive clock pulse and a positive cycle of S 34 occur simultaneously and a second d-c level state when a receive clock pulse and a positive cycle of −S 36 occur simultaneously. Such d-c level states may be made to correspond to +2 and −2 volts or any other values to be compatible with the operation of the related digital handling equipment.

It may be observed that detection of the peak values of signals S and −S in such a manner effectively reproduces as received data 48 the digital message at the transmit site.

Figure 4:
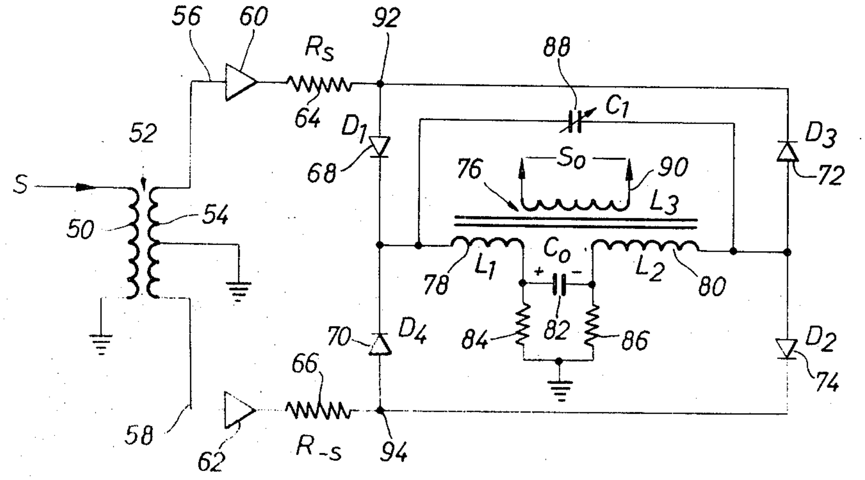
FIG. 4 is a schematic diagram of one subcircuit that may be employed in the receive circuit of the invention.

It may be recognized that the heart of the detection circuit relates to the operation of selective circuit 38, which is illustrated schematically in more detail in FIG. 4 together with an appropriate paraphase device 32.

In this circuit the complex, composite, message-coded signal S is applied to a paraphase device, such as primary 50 of transformer 52. The secondary 54 is grounded at the center tap such that the signal 56 taken off one-half of secondary 54 is in phase with the input and similar thereto and the signal 58 taken off the other half of secondary 54 is 180 degrees out of phase with the input although having a similar shape, or in other words, complementary to signal 56.

Alternately, complementary signals 56 and 58 may be derived from the emitter and collector connections of a conventional grounded-emitter transistor having appropriate resistors for maintaining equal voltage amplitudes. Other equally effective circuits and devices, such as push-pull amplifiers are, of course, available. Independent amplifiers 60 and 62 connected to signals 56 and 58 may also be used to ensure that the signals across load resistors 64 and 66, which may merely be the internal impedance of the coupling (e.g. paraphase) device, are equal but complementary.

The selective circuit for establishing a sine wave output $S_o$ regardless of the sequence of positive and negative cycles in the signals applied across resistors 64 and 66 comprises a diode gating circuit, a three-coil transformer, two capacitors and two resistors.

Diodes D1 68 and D4 70 are connected with their cathodes together and with their anodes connected respectively to resistors 64 and 66. Diodes D3 72 and D2 74 are connected with their anodes together and with their cathodes connected respectively to resistors 64 and 66.

Transformer 76 has two primary coils L1 78 and L2 80 having a high mutual inductance therebetween. A first end of coil L1 is connected to the junction between D1 and D4 and a first end of coil L2 is connected to the junction between D3 and D2. Capacitor $C_o$ 82 is connected between the second ends of coils L1 and L2.

Resistors 84 and 86 connect the second ends of coils L1 and L2 respectively to ground, thereby forming a parallel combination with capacitor $C_o$ by their series resistance.

Connected between the first ends of coils L1 and L2 is a variable capacitor C1 88.

Tertiary coil L3 90 is closely coupled to both L1 and L2 and, in accordance with the operation of the circuit described below, produces therein sinusoidally-shaped output signal $S_o$.

Alternately, capacitor C1 88 may be placed across coil L3 90, but the tuning capacitor C1 may not be placed across the L1–L2 combination, as shown, and coil L3.

Ideal operation of the circuit is predicated upon the proper biasing of signals S and –S applied to input points or terminals 92 and 94. These signals must have substantially equal instantaneous values when $\omega t$ equals a multiple of 2 pi for the signals S and –S.

In this event, it may be seen that diodes D1 and D4 have at the junction of their cathodes that signal which is going through a positive excursion. Conversely, diodes D2 and D3 have at the junction of their anodes that signal which is going through a negative excursion. Therefore, between these two junctions there appears a constant sinusoidal wave superimposed upon a d-c voltage.

Now consider a voltage cycle across resistor 64 which is positive but sinusoidal in shape as described previously. Such a voltage means that the voltage at the same time across resistor 66 is negative, thereby biasing diodes D1 and D2 for conduction and reverse biasing diodes D3 and D4 for cutoff. Hence, a sinusoidal cycle appears across D1 and D2, superimposed on a d-c voltage.

When a negative voltage cycle occurs across resistor 64 (meaning that simultaneously a positive voltage cycle occurs across resistor 66), diodes D3 and D4 are biased for conduction and diodes D1 and D2 are reversed biased for cutoff. This results in a current being passed through L1 and L2 similar in appearance in every respect to a uniform sinusoidal wave, regardless of whether a positive or negative voltage cycle of S drives the circuit.

In an actual preferred circuit construction, capacitor C1 and the inductance of inductors L1 and L2, as well as the mutual inductance therebetween, form a resonant circuit tuned to the frequency $S_o$. The reactance of capacitor $C_o$ between coils L1 and L2 is made negligible at the resonant frequency.

The combined reactance value of the a-c components just described (approximately Q of the resonant circuit comprising coils L1 and L2 times the reactance of capacitor C1) establish the a-c impedance between the two junction points of the four diodes at the resonant frequency $S_o$. Since the minimum value of the total d-c resistance between these diode junction points must equal the a-c impedance to maintain the proper biasing of the diodes, resistors 84 and 86 are normally of equal value and have a total value at least as large as the a-c impedance between the diode junction points.

With the values established as above, the circulating sine wave within the resonant circuit has a value of Q times the input current, as in the case with the usually driven resonant circuit. Tertiary winding L3 is used to couple the continuous, a-c, magnetic field generated by the circulating current through coils L1 and L2. Therefore, the voltage induced in tertiary winding L3 is a sine wave voltage at a frequency $S_o$.

Hence, it may be seen that signal selection in effected through shunt-loading this circuit by S and its complement –S. The selection of the output $S_o$ is accomplished through inductive coupling.

The impedance to the signal S between point 92, at the anode of diode 68, and point 94, at the anode of diode 70, is equal to Q times the parallel impedance of the resonant circuit. Selectivity to the signal S is great assuming the positive cycle within signal S and the negative cycle within signal S do not vary, causing the loading of the circuit to be light and allowing for an extremely high Q.

Figure 5:
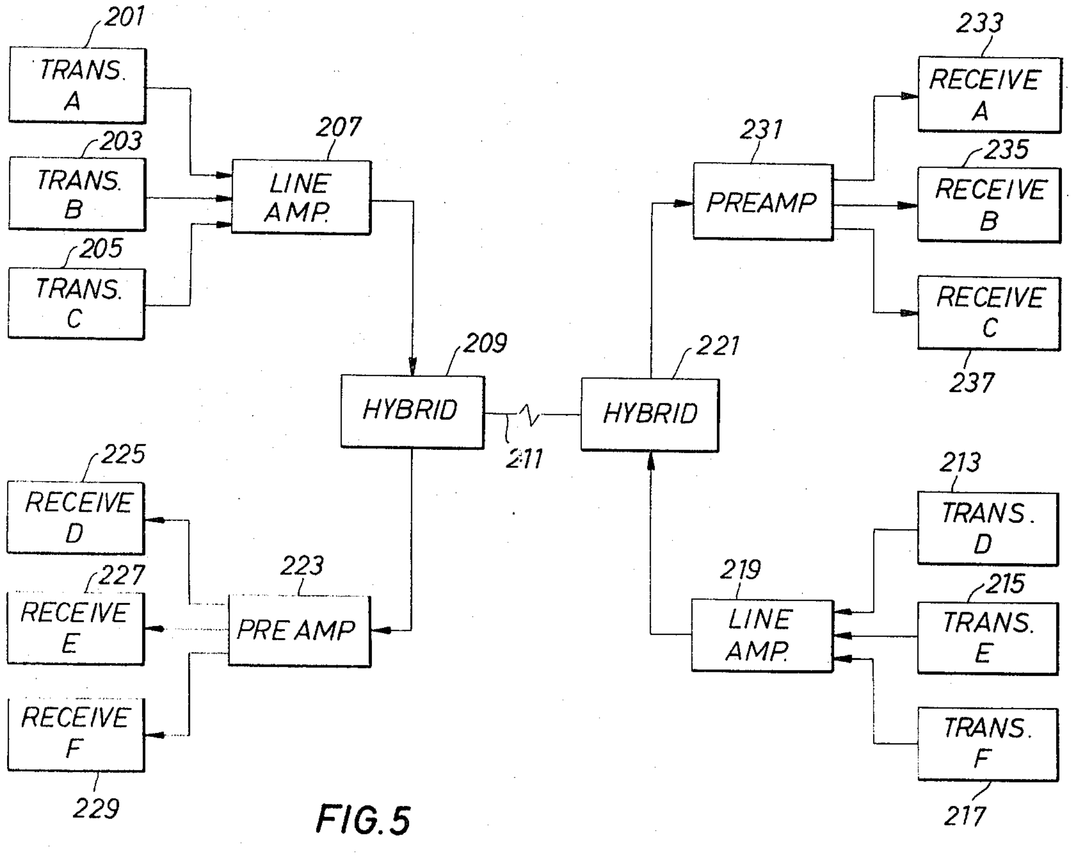
FIG. 5 is a simplified block diagram of an embodiment of the invention employing hybrid networks.

FIG. 5 shows a block diagram of a system which may be used for employing three signals of the above-described message-coded signal S type on a single cable or line. In such a system, at a first site typically three transmitters 201, 203 and 205, such as described in conjunction with FIG. 2, apply their signals to the same line amplifier 207, which, in turn, applies its conglomerate signal to a hybrid circuit 209. The hybrid circuit is connected to cable 211 leading to a second site.

At the second site typically three transmitters 213, 215 and 217, similar to transmitters 201, 203 and 205, apply their signals to the same line amplifier 219, similar to amplifier 207. This line amplifier, in turn, applies its conglomerate signal to a hybrid circuit 221 connected to cable 211.

At the first site, the receiving network of hybrid circuit 209 is connected to preamplifier 223, in turn, connected to receivers 225, 227 and 229, such as described in conjunction with FIG. 3. Similarly, at the second site, the receiving network of hybrid circuit 221 is connected to preamplifier 231, in turn, connected to receivers 233, 235 and 237, similar to receivers 225, 227 and 229.

Transmitter A 201 and receiver A 233 operate at a first angular velocity, transmitter B 203 and receiver B 235 operate at a second angular velocity, and transmitter C 205 and receiver C 237 operate at a third angular velocity. Similarly, transmitter D 213 and receiver D 225 operate at fourth angular velocity, transmitter E 215 and receiver E 227 operate at a fifth angular velocity, and transmitter F 217 and receiver F 229 operate at a sixth angular velocity.

In the normal case, since hybrid circuits 209 and 211 allow for full duplex operation keeping communications in one direction from interfering with communications from the opposite direction, transmitter A and receiver A may be operated at the same frequency as transmitter D and receiver D. Similarly, transmitter B and receiver B may be operated at the same frequency as transmitter E and receiver E and transmitter C and receiver C may be operated at the same frequency as transmitter F and receiver F.

FREQUENCY MODULATION APPLICATION

Figure 7:
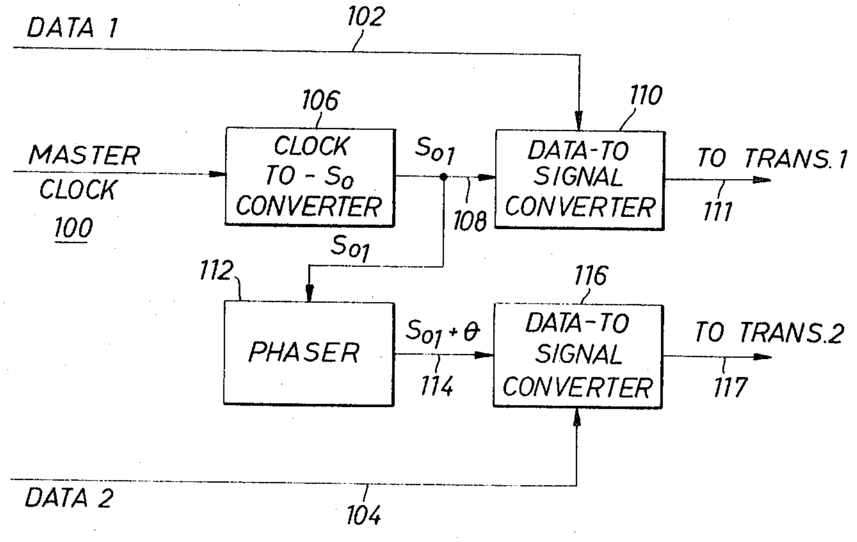
FIG. 7 is a simplified block diagram of another embodiment of a transmit circuit of the invention.
Figure 8:
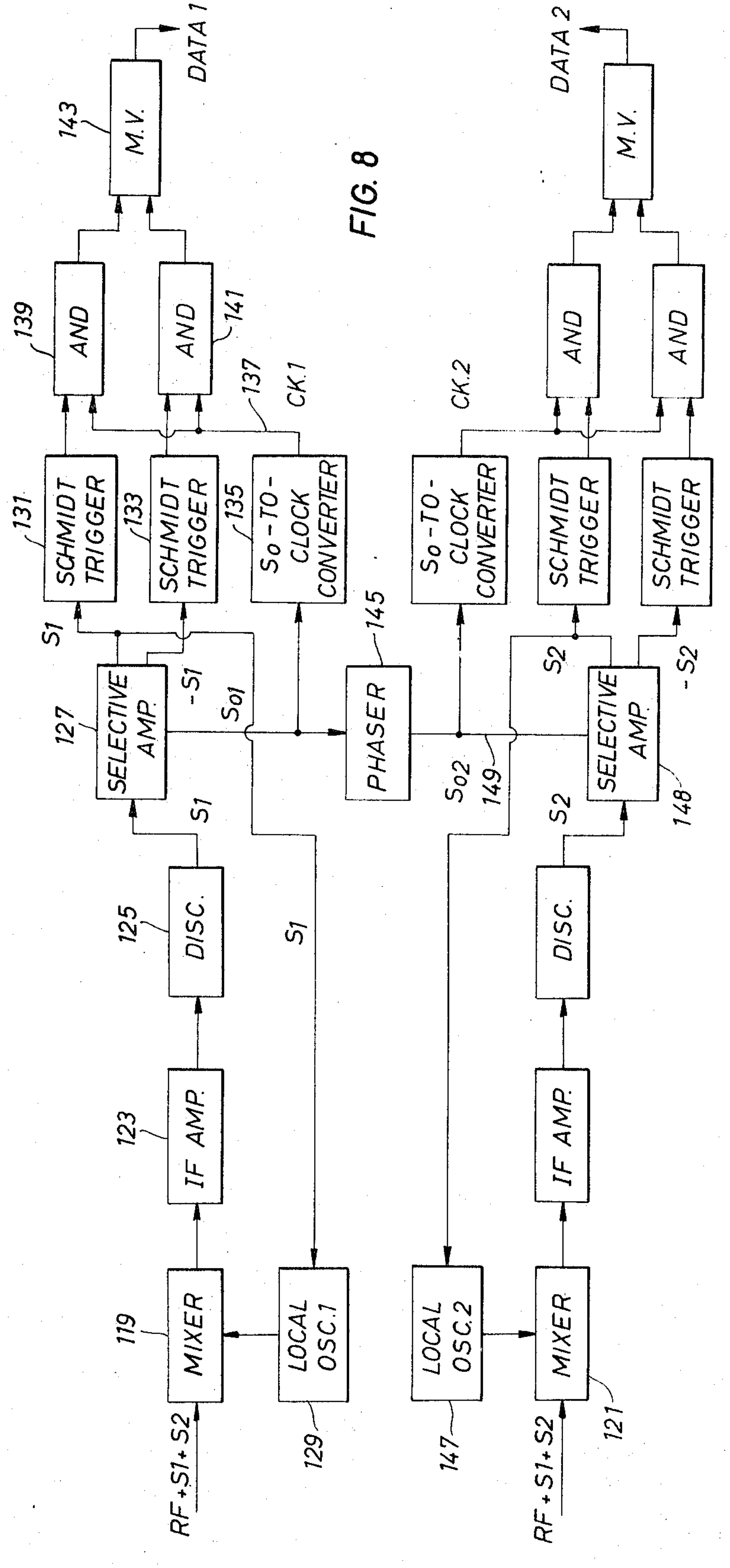
FIG. 8 is a simplified block diagram of another embodiment of a receive circuit of the invention.
Figure 6:
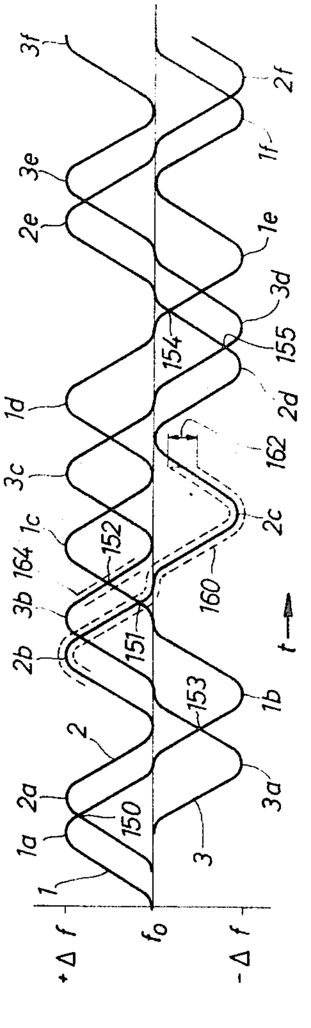
FIG. 6 is a waveform diagram showing the waveform relations of another illustrated embodiment of the invention.

Now turning to FIGS. 6, 7 and 8, an embodiment of the invention is illustrated which includes the transmission and reception of multiple two-state data signals over the same frequency modulation communications channel, without materially increasing the bandwidth requirements thereof.

In such an application, the multiple signals are all related to the same clock pulse signal, each signal being separated from the other signals by a preestablished and predetermined phase separation.

FIG. 6 is an illustrative transmit site controlled by a master clock signal 100. The two-state data information takes the form of a first data message 102 and a second data message 104, each data message having the same fixed data bit interval.

Master clock signal 100 is applied to a clock-to-$S_o$ converter circuit 106, as previously described in connection with the basic data-message system described above. The resulting signal $S_o$ 108 is then applied to a data-to-signal converter circuit 110 along with first data message 102 to produce a complex, composite signal 111, also as previously described in connection with the basic data-message system.

Signal $S_o$ is also supplied to a phaser circuit 112, of conventional design which shifts the phase of the incoming circuit by some slight fixed amount $\theta$ to produce an output identical to the input but at some slightly later time. The limits of the amount $\theta$ in a practical, operating circuit is explained below.

In any event, signal output 114 from phase circuit 112, which may be conveniently referred to as $S_o + \theta$, in then applied along with second data signal 104 to another data-to-signal converter circuit 116, thereby producing another complex, composite signal 117 coded with the second data message information.

Signals 111 and 117 may be transmitted to the receive station via independent frequency-modulation transmission means or may be applied to the same frequency-modulation transmission means. Regardless of the means employed to effect transmission, it may be assumed for purposes of discussion that both information signals are produced in the same communication channel, somewhat on the order as shown for three such complex signals in FIG. 6. The illustrated presentation of the signals is shown in FIG. 6 as they might appear in the spectrum during frequency modulation about a center frequency $f_o$ and having frequency deviations of $+\Delta f$ and $-\Delta f$.

FIG. 8 shows standard frequency-modulation, inverse feedback receivers employing narrow band pass *i–f* amplifiers in conjunction with special circuits described below.

The received spectrum comprising the *r–f* carrier, as well as the two signals 111 and 117, are received at both mixer 119 and 121 after initial receipt. It may be assumed for purposes of discussion that the received spectrum has its carrier removed in mixer 119 in a conventional manner. Similarly, the resulting signal is amplified in an *i–f* amplifier 123, the characteristics of which are more fully described below, and detected in discriminator 125 to produce a suitable signal S1 to selective amplifier 127. It should be also noted that signal S2 might be the signal to trigger the operation of selective amplifier 127 initially rather than S1, but through any convenient identification scheme and with the foreknowledge of the predetermined phase separation between S1 and S2, signal S1 may be discerned from S2 and appropriate repositioning effected to ensure operation with signal S1.

Once operation is established using S1 in selective amplifier 127, three outputs from the selective amplifier are produced: viz., S1, –S1 and $S_{o1}$. Signals S1 and –S1 are merely the complex, composite coded signal containing the first data message and its complement. Signal $S_{o1}$ is a sinusoidal wave phased in synchronism with S1 and –S1.

Signal S1 (or alternately signal –S1) is applied back to local oscillator 129, in turn connected to mixer 119, to cause the signal from mixer 119 to track S1. The signal from local oscillator 1 is, therefore, an *r–f* signal at the frequency of the received carrier frequency modulated with the signal S1 (or –S1).

Signal $S_{o1}$ is applied to an $S_o$-to-clock converter circuit 135 to produce a first receive clock signal CK1 137.

Signal S1 from the selective amplifier 127 is applied to a Schmidt trigger circuit 131, which produces a pulse when the signal S1 is near a positive peak. Signal –S1 from the selective amplifier 127 is applied to a Schmidt trigger circuit 133 to produce a pulse when the signal –S1 is near a positive peak (signal S1 is near a negative peak).

First receive clock signal 137 is applied to two AND circuits, viz., circuits 139 and 141. Also applied to AND circuit 139 is the pulse from Schmidt trigger 131 and also applied to AND circuit 141 is the pulse from Schmidt trigger 133. Therefore, at the occurrence of every clock pulse a signal is produced from either circuit 139 or 141, depending upon the presence of a peak for signal S1 or for Signal –S1.

Multivibrator circuit 143, connected to receive the produced inputs from both circuits 139 and 141, is a bistable network including proper diode gates so that an input from circuit 139 produces a first state output and an input from circuit 141 produces a second state output. Moreover, if the first state output is being produced another pulse from circuit 139 has no effect in changing the state of the output. Similarly, if the second state output is being produced another pulse from circuit 141 has no effect. Therefore, the signal produced from multivibrator 143 is an accurate reproduction of the first data message.

Signal $S_{o1}$ is applied to a phaser or phase shift circuit 145, similar to phaser 112 at the transmit site, to produce an output similar in shape to $S_{o1}$ but phase shifted by an amount $\theta$, the same amount that phaser circuit 112 produced at the transmit site. This produced output from phaser 145 may be designated $S_{o2}$.

The signal $S_{o2}$ ($S_{o1} + \theta$) 149 is applied to selective amplifier 148. If the circuit employed is similar to that shown in FIG. 4, signal $S_{o2}$ may either be applied to tertiary winding 90 or to a fourth winding (not shown) closely coupled to coils L1, L2 and L3. Such a connection ensures the operation of the second data-message-related components in conjunction with the proper receive signal S, namely S2.

Circuits duplicate to those just described for producing the first data message are used to produce the second data message. Again, either signal S2 or –S2 may be used to control the frequency of the local oscillator, in this case, local oscillator 2 147.

Signal $S_{o2}$ 149 is applied to the $S_o$-to-clock converter circuit to produce clock pulse signal CK2, as with the first data message channel. The remaining operations in the production of the eventually produced second data message are likewise similar to the corresponding operations in the production of the first data message.

Referring to FIG. 6, it may be seen that the received complex, composite signals 1, 2 and 3 may take any order from cycle to cycle, but for discussion purposes, data message signal 1 is coded 1–0–1–1–0–0, data message signal 2 in coded 1–1–00–1–0 and data message signal 3 is coded 0–1–1–0–1–1 In this typical situation, the peaks are identified for signal 1 as 1*a*, 1*b*, 1*c*, etc., for signal 2 as 2*a*, 2*b*, 2*c*, etc., and for signal 3 as 3*a*, 3*b*, 3*c*, etc. Cross-over points occur at typical points 150 through 155.

While tracking, the only possible manner in which the circuit operating in conjunction with signal S1 may jump from tracking a first signal to tracking a second is by following the wrong signal away from a cross-over point. It may be noticed that in every case, the slope of the curves away from the cross-over points are opposite, meaning that it is exceedingly unlikely that a circuit having inertia of operation in tracking one signal would abruptly break its operating tendency to follow a new tracking mode.

It should be noted that the spacing of the complex signals may be as close together as operations will allow without the first or base receive circuit described above jumping from a first signal to the second. Because of the ready availability of circuits having high Q values (e.g., 100 even at relatively low frequencies—e.g., 3kc.), spacing of multiple signal at 18-degree intervals (10 percent of one-half of the $S_o$ cycle) has been found to be totally acceptable, although closer spacing is probably operable.

Actually, there is a limit to the number of data-message signals that may be crowded into one channel spectrum. Shown with dotted lines at area 160 is the frequency spectrum occupied by one data-message signal, in this case, signal 2. The width of this area is determined by the band-width characteristics of the *i–f* amplifier in the receiver operating in conjunction with the particular data-message signal. The measure of this band width is vertical dimension 162, the vertical dimension from one edge of area 160 to the opposite edge taken at the greatest slope of the signal.

Another area 164 for another signal (e.g., signal 3) is partly shown. The theoretical maximum number of signals present in the entire channel spectrum is hence limited by the *i–f* band-width of the receivers (when the spectrum is completely filled no other data-message signals may be phased positioned therein). Actually, noise and the slight tendency for the tracking circuits to jump prevents the absolute filling of the entire channel spectrum with data.

While various embodiments of the invention have been described, it is obvious that various substitutes or modifications of structure may be made without varying from the scope of the invention.

What is claimed is:

1. The method of transmitting and receiving two-state data information comprising at least a first and second data message, each of said data messages having the same fixed data bit interval, which comprises generating a first clock pulse signal having the interval of an information data bit, establishing a first sinusoidal waveform from said clock pulse signal having a period equalling the interval between successive clock pulses, such that the same polarity peak occurrence on successive cycles coincides with a clock pulse in said clock pulse signal, and biased positively with respect to a fixed d-c potential, establishing a second sinusoidal waveform substantially equal in amplitude to the amplitude of said first sinusoidal waveform and complementary thereto, and biased negatively with respect to a fixed d-c potential, selecting at the time of the switching points between information data bits of said first data message between said first sinusoidal waveform and said second sinusoidal waveform as determined by the state of the two-state data information, thereby forming a first composite waveform the polarity of which between said switching points corresponds to a state of said first data message, shifting the phase of said first and second sinusoidal waveforms by the same amount to establish third and fourth sinusoidal waveforms, the amount of phase shift being sufficient to provide distinction between said first composite waveform formed from said first and second sinusoidal waveforms and a similar second composite waveform formed from said third and fourth sinusoidal waveforms during transmission and reception thereof, selecting at the time of the switching points between information data bits of said second data message between said third sinusoidal waveform as determined by the state of the two-state data information, thereby forming a second composite waveform the polarity of which between said switching points corresponds to a state of said second data message, transmitting said first and second composite waveforms, receiving said first and second composite waveforms, creating a fifth sinusoidal waveform from the first of said received composite waveforms corresponding to said first sinusoidal waveform, establishing a second clock pulse signal from said fifth sinusoidal waveform such that the clock pulses therein occur at the peaks of the first of said received composite waveforms, establishing the first data message by detecting the polarity of the first of said received composite waveforms at the occurrence of the clock pulses in said second clock pulse signal, shifting the phase of said fifth sinusoidal waveform by an amount and in the direction of the phase shift of said third and fourth sinusoidal waveforms from said first and second sinusoidal waveforms to establish a sixth sinusoidal waveform, establishing a third clock pulse signal from said sixth sinusoidal waveform such that the clock pulses therein occur at the peaks of the second of said received composite waveforms, and establishing the second data message by detecting the polarity of the second of said received composite waveforms at the occurrence of the clock pulses in said third clock pulse signal.

2. The method of preparing for transmission two-state data information comprising at least a first and second data message, each of said data messages having the same fixed data bit interval, which comprises generating a first clock pulse signal having the interval of an information data bit, establishing a first sinusoidal waveform from said clock pulse signal having a period equalling the interval between successive clock pulses, such that the same polarity peak occurrence on successive cycles coincides with a clock pulse in said clock pulse signal, and biased positively with respect to a fixed d-c potential, establishing a second sinusoidal waveform substantially equal in amplitude to the amplitude of said first sinusoidal waveform and complementary thereto, and biased negatively with respect to a fixed d-c potential, selecting at the time of the switching points between information data bits of said first data message between said first sinusoidal waveform and said second sinusoidal waveform as determined by the state of the two-state data information, thereby forming a first composite waveform the polarity of which between said switching points corresponds to a state of said first data message, shifting the phase of said first and second sinusoidal waveforms by the same amount to establish third and fourth sinusoidal waveforms, the amount of phase shift being sufficient to provide distinction between said first composite waveform formed from said first and second sinusoidal waveforms and a similar second composite waveform formed from said third and fourth sinusoidal waveforms during transmission and reception thereof, and selecting at the time of the switching points between information data bits of said second data message between said third sinusoidal waveform and said fourth sinusoidal waveform as determined by the state of the two-state data information, thereby forming a second composite waveform the polarity of which between said switching points corresponds to a state of said second data message.

3. The method of converting to two-voltage state message form a composite received signal coded with two-state data information comprising at least first and second data message composite waveforms, wherein each of said data message composite waveform has substantially equal cycle periods such that a first type sinusoidally-shaped cycle progressing from a zero peak to a positive peak to a zero peak represents a first data state and a second type sinusoidally-shaped cycle progressing from a zero peak to a negative peak to a zero peak represents the second data state, said first and second data message composite waveforms being phase separated by a slight amount, comprising creating a first sinusoidal waveform from the first of said data message composite waveforms, establishing a first clock pulse signal from said first sinusoidal waveform such that the clock pulses therein occur at the peaks of the first of said data message composite waveforms, establishing the first two-voltage state message by detecting the polarity of the first of said data message composite waveforms at the occurrence of the clock pulses in said first clock pulse signal, shifting the phase of said first sinusoidal waveform by an amount and in the direction of the phase separation between said first and second data message composite waveforms to establish a second sinusoidal waveform, establishing a second clock pulse signal from said second sinusoidal waveform such that the clock pulses therein occur at the peaks of the second of said data message composite waveform, and establishing the second two-voltage state message by detecting the polarity of the second of said data message composite waveforms at the occurrence of the clock pulses in said second clock pulse signal.

4. The method of converting to two-voltage state message form a composite received signal coded with two-state data information comprising at least first and second data message composite waveforms, wherein each of said data message composite waveforms has substantially equal cycle periods such that a first type sinusoidally-shaped cycle progressing from a zero peak to a positive peak to a zero peak represents a first data state and a second type sinusoidally-shaped cycle progressing from a zero peak to a negative peak to a zero peak represents the second data state, said first and second data message composite waveforms being phase separated by a slight amount, comprising paraphasing the first of said data message composite waveforms to derive a first signal and a second signal complementary thereto, both of said derived signals being similarly shaped to said first data message composite waveform, selecting similarly progressing cycles from between said first and second signals to establish a first substantially sinusoidal waveform, establishing a first clock pulse signal from said first sinusoidal waveform, the clock pulses therein coinciding with the same polarity peak amplitude of said sinusoidal signal on successive cycles thereof, establishing a first two-voltage state message having a first voltage state when a clock pulse in said first clock pulse signal and a first type sinusoidally-shaped cycle of said first derived signal occur simultaneously and a second voltage state when a clock pulse in said first clock pulse signal and a second type sinusoidally-shaped cycle of said second derived signal occur simultaneously, a voltage state in said first two-voltage state message persisting until a new state is established, shifting the phase of said first sinusoidal waveform by an amount and in the direction of the phase separation between said first and second data message composite waveforms to establish a second sinusoidal waveform, establishing a second clock pulse signal from said second sinusoidal waveform, the clock pulse therein coinciding with the same polarity peak amplitude of said sinusoidal signal on successive cycles thereof, paraphasing the second of said data message composite waveforms to derive a third signal and a fourth signal complementary thereto, both of said derived signals being similarly shaped to said second data message composite waveform, establishing a second two-voltage state message having a first voltage state when a clock pulse in said second clock pulse signal and a first type sinusoidally-shaped cycle of said third derived signal occur simultaneously and a second voltage state when a clock pulse in said second clock pulse signal and a second type sinusoidally-shaped cycle of said fourth derived signal occur simultaneously, a voltage state in said second two-voltage state message persisting until a new state is established.

5. The method of converting to two-voltage state message form a composite received signal coded with two-state data information comprising at least first and second data message composite waveforms, wherein each of said data message composite waveform has substantially equal cycle periods such that a first type sinusoidally-shaped cycle progressing from a zero peak to a positive peak to a zero peak represents a first data state and a second type sinusoidally-shaped cycle progressing from a zero peak to a negative peak to a zero peak represents the second data state, said first and second data message composite waveforms being phase separated by a slight amount, comprising inverting the first of said data message composite waveforms to establish a complementary signal thereto, selecting similarly progressing cycles from between said first data message composite and inverted waveforms to establish a first substantially sinusoidal waveform, establishing a first clock pulse signal from said first sinusoidal waveform, the clock pulses therein coinciding with the same polarity peak amplitude of said sinusoidal signal on successive cycles thereof, establishing a first two-voltage state message having a first voltage state when a clock pulse in said first clock pulse signal and a first type sinusoidally-shaped cycle of said first data message composite waveform occur simultaneously and a second voltage state when a clock pulse in said first clock pulse signal and a second type sinusoidally-shaped cycle of said inverted waveform occur simultaneously, a voltage state in said first two-voltage state message persisting until a new state is established, shifting the phase of said first sinusoidal waveform by an amount and in the direction of the phase separation between said first and second data message composite waveforms to establish a second sinusoidal waveform, establishing a second clock pulse signal from said second sinusoidal waveform, the clock pulses therein coinciding with the same polarity peak amplitude of said sinusoidal signal on successive cycles thereof, inverting the second of said data message composite waveforms to establish a complementary signal thereto, establishing a second two-voltage state message having a first voltage state when a clock pulse in said second clock pulse signal and a first type sinusoidally-shaped cycle of said second data message derived composite waveform occur simultaneously and a second voltage state when a clock pulse in said second clock pulse signal and a second type sinusoidally-shaped cycle of said inverted waveform occur simultaneously, a voltage state in said second two-voltage state message persisting until a new state is established.

6. The method of transmitting and receiving two-state data information comprising at least a first and second data message, each of said data messages having the same fixed data bit interval, which comprises generating a first clock pulse signal having the interval of an information data bit, establishing a first sinusoidal waveform from said clock pulse signal having a period equalling the interval between successive clock pulses, such that the same polarity peak occurrence on successive cycles coincides with a clock pulse in said clock pulse signal, and biased positively with respect to a fixed d-c potential, establishing a second sinusoidal waveform substantially equal in amplitude to the amplitude of said first sinusoidal waveform and complementary thereto, and biased negatively with respect to a fixed d-c potential, selecting at the time of the switching points between information data bits of said first data message between said first sinusoidal waveform and said second sinusoidal waveform as determined by the state of the two-state data information, thereby forming a first composite waveform the polarity of which between said switching points corresponds to a state of said first data message, shifting the phase of said first and second sinusoidal waveforms by the same amount to establish third and fourth sinusoidal waveforms, the amount of phase shift being sufficient to provide distinction between said first composite waveform formed from said first and second sinusoidal waveforms and a similar second composite waveform formed from said third and fourth sinusoidal waveforms during transmission and reception thereof, selecting at the time of the switching points between information data bits of said second data message between said third sinusoidal waveform as determined by the state of the two-state data information, thereby forming a second composite waveform the polarity of which between said switching points corresponds to a state of said second data message, transmitting said first and second composite waveforms, receiving said first and second composite waveforms, creating a fifth sinusoidal waveform from the first of said received composite waveforms corresponding to said first sinusoidal waveform, establishing a second clock pulse signal from said fifth sinusoidal waveform such that the clock pulses therein occur at the peaks of the first of said received composite waveforms, establishing the first data message by detecting the polarity of the first of said received composite waveforms at the occurrence of the clock pulses in said second clock pulse signal, shifting the phase of said fifth sinusoidal waveform by an amount and in the direction of the phase shift of said third and fourth sinusoidal waveforms from said first and second sinusoidal waveforms until the cycles thereof coincide with the cycles of the second of said received composite waveform to establish a sixth sinusoidal waveform, establishing a third clock pulse signal from said sixth sinusoidal waveform such that the clock pulses therein occur at the peaks of the second of said received composite waveforms, and establishing the second data message by detecting the polarity of the second of said received composite waveforms at the occurrence of the clock pulses in said third clock pulse signal.

7. The method of transmitting and receiving two-state data information comprising at least a first and second data message, each of said data messages having a fixed data bit interval, which comprises establishing a first sinusoidal waveform biased positively with respect to a fixed d-c potential, establishing a second sinusoidal waveform substantially equal in amplitude to the amplitude of said first sinusoidal waveform and complementary thereto, and biased negatively with respect to a fixed d-c potential, selecting at the time of the transition points between information data bits of the first data message between said first sinusoidal waveform as determined by the state of the two-state data information, thereby forming a first composite waveform the polarity of which between transition points corresponds to a state of the two-state data information of the first data message, said waveform being at a first angular velocity, establishing a third sinusoidal waveform having a second angular velocity different from said first angular velocity biased positively with respect to a fixed d-c potential, establishing a fourth sinusoidal waveform substantially equal in amplitude to the amplitude of said third sinusoidal waveform and complementary thereto, and biased negatively with respect to a fixed d-c potential, selecting at the time of the transition points between information data bits of the second data message between said third sinusoidal waveform as determined by the state of the two-state data information, thereby forming a second composite waveform the polarity of which between transition points corresponds to a state of the two-state data information of the second data message, said waveform being at said second angular velocity, transmitting said first and second composite waveforms, receiving said first and second composite waveforms, creating a fifth sinusoidal waveform from said received first composite waveform of said first data message at said first angular velocity, establishing the first data message by detecting the polarity of said received first composite waveform during the occurrence of each cycle of said fifth sinusoidal waveform, creating a sixth sinusoidal waveform from said received composite waveform from said received second composite waveform of said second data message at said second angular velocity, establishing the second data message by detecting the polarity of said received second composite waveform during the occurrence of each cycle of said sixth sinusoidal waveform.

8. The method of claim 7, wherein said first composite waveform is formed at a first location and said second composite waveform is formed at a second location, said first and second angular velocities are the same, and said transmitting and receiving steps are performed in full duplexing operation.

9. The method of preparing for transmission of two-state data information comprising at least a first and second data message, each of said data messages having a fixed data bit interval, which comprises establishing a first sinusoidal waveform biased positively with respect to a fixed d-c potential, establishing a second sinusoidal waveform substantially equal in amplitude to the amplitude of said first sinusoidal waveform and complementary thereto, and biased negatively with respect to a fixed d-c potential, selecting at the time of the transition points between information data bits of the first data message between said first sinusoidal waveform as determined by the state of the two-state data information, thereby forming a first composite waveform the polarity of which between transition points corresponds to a state of the two-state data information of the first data message, said waveform being at a first angular velocity, establishing a third sinusoidal waveform having a second angular velocity different from said first angular velocity biased positively with respect to a fixed d-c potential, establishing a fourth sinusoidal waveform substantially equal in amplitude to the amplitude of said third sinusoidal waveform and complementary thereto, and biased negatively with respect to a fixed d-c potential, and selecting at the time of the transition points between information data bits of the second data message between said third sinusoidal waveform as determined by the state of the two-state data information, thereby forming a second composite waveform the polarity of which between transition points corresponds to a state of the two-state data information of the second data message, said waveform being at said second angular velocity.

10. The method of converting to two-voltage state message form a composite received signal coded with two-state data information comprising at least first and second data message composite waveforms, wherein each of said data message composite waveforms has substantially equal cycle periods such that a first type sinusoidally-shaped cycle progressing from a zero peak to a positive peak to a zero peak represents a first data state and a second type sinusoidally-shaped cycle progressing from a zero peak to a negative peak to a zero peak represents the second data state, said first and second data message composite waveforms being at slightly different angular velocities, comprising creating a first sinusoidal waveform from said received first data message composite waveform at a first angular velocity, establishing the first data message in two-voltage state message form by detecting the polarity of said received first data message composite waveform during the occurrence of each cycle of said first sinusoidal waveform, creating a second sinusoidal waveform from said received second data message composite waveform at a second angular velocity, and establishing the second data message in two-voltage state message form by detecting the polarity of said received second data message composite waveform during the occurrence of each cycle of said second sinusoidal waveform.

11. The method of converting to two-voltage state message form a composite received signal coded with two-state data information comprising at least first and second data message composite waveforms, wherein each of said data message composite waveforms has substantially equal cycle periods such that a first type sinusoidally-shaped cycle progressing from a zero peak to a positive peak to a zero peak represents a first data state and a second type sinusoidally-shaped cycle progressing from a zero peak to a negative peak to a zero peak represents the second data state, said first and second data message composite waveforms being at slightly different angular velocities, comprising creating a first sinusoidal waveform from said received first data message composite waveform at a first angular velocity, establishing a first clock pulse signal from said first sinusoidal waveform such that the clock pulses therein occur at the peaks of said received first data message composite waveform, establishing the first data message in two-voltage state message form by detecting the polarity of said received first data message composite waveform at the occurrence of each of the clock pulses in said first clock pulse signal, creating a second sinusoidal waveform from said received second data message composite waveform at a second angular velocity, establishing a second clock pulse signal from said second sinusoidal waveform such that the clock pulses therein occur at the peaks of said received second data message composite waveform, and establishing the second data message in two-voltage state message form by detecting the polarity of said received second data message composite waveform at the occurrence of each of the clock pulses in said second clock pulse signal.

* * * * *